US008133524B1

(12) United States Patent
Acar et al.

(10) Patent No.: US 8,133,524 B1
(45) Date of Patent: Mar. 13, 2012

(54) FOOD COMPOSITION FOR HEMOPHAGOUS INSECTS

(75) Inventors: E. Barçin Acar, Sammamish, WA (US); Geoffrey F. Deane, Bellevue, WA (US); 3ric Johanson, Seattle, WA (US); Emma Rae Mullen, Seattle, WA (US); Nathan P. Myhrvold, Bellevue, WA (US); Nels R. Peterson, Seattle, WA (US); Clarence T. Tegreene, Bellevue, WA (US); Charles Whitmer, North Bend, WA (US); Lowell L. Wood, Jr., Bellevue, WA (US)

(73) Assignee: Tokitae LLC, Bellevue, WA (US)

( * ) Notice: Subject to any disclaimer, the term of this patent is extended or adjusted under 35 U.S.C. 154(b) by 0 days.

(21) Appl. No.: 12/928,460

(22) Filed: Dec. 10, 2010

(51) Int. Cl.
*A23K 1/18* (2006.01)

(52) U.S. Cl. ........ 426/583; 426/656; 426/561; 426/562; 426/647

(58) Field of Classification Search .................. 426/561, 426/562, 647, 583, 656
See application file for complete search history.

(56) References Cited

U.S. PATENT DOCUMENTS

| 3,879,563 | A | * | 4/1975 | Tucker et al. | ................. 426/128 |
| 4,014,991 | A | * | 3/1977 | Baer et al. | ................... 424/224.1 |
| 4,506,473 | A | * | 3/1985 | Waters, Jr. | ....................... 43/107 |
| 4,734,287 | A | | 3/1988 | Singer et al. | |
| 5,609,879 | A | * | 3/1997 | Myles | ......................... 424/410 |
| 5,928,634 | A | * | 7/1999 | Uick et al. | ...................... 424/84 |
| 6,730,336 | B2 | * | 5/2004 | Villagran et al. | ............... 426/72 |
| 2004/0170662 | A1 | * | 9/2004 | Ollis et al. | ..................... 424/410 |
| 2010/0298247 | A1 | * | 11/2010 | Wilson et al. | .................... 514/28 |

FOREIGN PATENT DOCUMENTS

EP 2119372 A1 * 11/2009

OTHER PUBLICATIONS

Arsic, Dany et al.; "Nutrient content of diet affects the signaling activity of the insulin/target of rapamycin/p70 S6 kinase pathway in the African malaria mosquito *Anopheles gambiae*"; Journal of Insect Physiology; Bearing a date of 2008; pp. 1226-1235; vol. 54, No. 8.
Axtell, R. C. et al.; "Encapsulation of the Mosquito Fungal Pathogen *Lagenidium giganteum*(Oomycetes:Lagenidiales) in Calcium Alginatei"; Journal of the American Mosquito Control Association; Bearing a date of Sep. 1987; pp. 450-459; vol. 3, No. 3.

Beach, Eliot F. et al; "Distribution of Nitrogen and Protein Amino Acids in Human and in Cow's Milk"; Bearing dates of Jan. 16, 1941 and Nov. 29, 2010; pp. 57-63.
Bukhari, Tullu et al.; "Factors affecting fungus-induced larval mortality in *Anopheles gambiae* and *Anopheles stephensi*"; Malaria Journal; Bearing a date of 2010; pp. 1-15; vol. 9, No. 22; Bukhari et al., Licensee BioMed Central Ltd.
Cetin, Huseyin et al; "Evaluation of the naturally-derived insecticide spinosad against *Culex pipens* L. (Diptera: Culicidae) larvae in septic tank water in Antalya, Turkey"; Journal of Vector Ecology; Bearing dates of Jan. 3, 2005 and Feb. 16, 2005; pp. 151-154; vol. 30, No. 1.
Chang, Yen-Yun H. et al.; "Amino Acid Composition of Human and Guinea Pig Blood Proteins, and Ovarian Proteins of the Yellow Fever Mosquito *Aedes aegypti*; and Their Effects on the Mosquito Egg Production"; Comp. Biochem. Physiol.; Bearing dates of Mar. 8, 1978 and 1979; pp. 753-755; vol. 62A; Pergamon Press Ltd.
"CP Kelco Microparticulated Whey Protein Concentrate"; CPKelco A Huber Company; Bearing a date of 2010; Printed on Dec. 6, 2010; p. 1; CPKelco; located at http://www.cpkelco.com/products-mwpc.html.
Greenberg, Joseph; "Some Nutritional Requirements of Adult Mosquitos (*Aedes aegypti*) for Oviposition"; The Journal of Nutrition; Bearing dates of Aug. 15, 1950 and Nov. 14, 2010; pp. 27-35.
Lichtwardt, Robert W. et al.; "A new Coelomomyces pathogenic to mosquitoes in Costa Rica"; Rev. Biol. Trop.; Bearing a date of 1993; pp. 407-410; vol. 41, No. 3.
Nisbet, Andrew D. et al.; "The Complete Amino-Acid Sequence of Hen Ovalbumin"; Eur. J. Biochem.; Bearing dates of Sep. 12, 1980, Nov. 27, 1980 and 1981; pp. 335-345; vol. 115; FEBS.
"Product Information, Albumin from chicken egg white"; SIGMA; Printed on Dec. 9, 2010; p. 1; Sigma-Aldrich, Inc.; located at www.sigma-aldrich.com.
Schenker, W. et al.; "The effects of Nosema algarae on the development of *Plasmodium yoelii nigeriensis* in *Anopheles stephensi*"; Parasitology Research; Bearing dates of Jul. 21, 1991 and 1992; pp. 56-59; vol. 78; Springer-Verlag.
Uchida, Keikichi; "Balanced Amino Acid Composition Essential for Infusion-induced Egg Development in the Mosquito (*Culex pipiens pallens*)"; J. Insect Physiol.; Bearing dates of Nov. 5, 1992 and 1993; pp. 615-621; vol. 39, No. 7; Pergamon Press Ltd.
Uchida, Keikichi et al.; "Ovarian development induced in decapitated female *Culex pipiens pallens* mosquitoes by infusion of physiological quantities of 20-hydroxyecdysone together with amino acids."; Journal of Insect Physiology; Bearing dates of Dec. 22, 1996, Oct. 28, 1997 and 1998; pp: 525-528; vol. 44; Elsevier Science Ltd.
"Whey Protein Concentrate 80%, (Protein content 80% Dry Basis)"; Davisco Foods International, Inc.; Printed on Dec. 9, 2010; p. 1; located at www.DaviscoFoods.com.

\* cited by examiner

*Primary Examiner* — C. Sayala

(57) ABSTRACT

A composition suitable for feeding hemophagous insects includes peptides, salt, and a $CO_2$ generator.

25 Claims, No Drawings

FOOD COMPOSITION FOR HEMOPHAGOUS INSECTS

SUMMARY

In one aspect, a food composition includes a protein mixture including albumin and whey protein in a ratio between about 3:1 and about 12:1 dry weight, respectively, sodium chloride, and a $CO_2$ generator. The $CO_2$ generator may include sodium bicarbonate or an edible acid (e.g., citric acid, acetic acid, ascorbic acid, malic acid, lactic acid, tartaric acid, phosphoric acid, oxalic acid, benzoic acid, or butyric acid). The food composition may further include a sugar (e.g., glucose), a blood component (e.g., plasma, hemoglobin, gamma globulin, red blood cells, adenosine triphosphate, glucose, or cholesterol), which may be at a concentration approximately equal to a physiological level for human blood, a preservative, a stabilizer, an insect attractant, an insect repellent, a pheromone, a kairomone, an allomone, an insect phagostimulant, or a colorant. The food composition may be water-soluble, and may be dissolved in a liquid (e.g., water or blood plasma) or a gel, which may include a preservative, a stabilizer, an insect attractant, an insect repellent, a pheromone, a kairomone, an allomone, an insect phagostimulant. Protein may be present in the liquid in a concentration between about 40 g/L and 100 g/L, and the liquid may be equivalently isotonic, substantially isotonic, or isotonic.

In another aspect, a food composition includes a peptide component, sodium chloride, and a $CO_2$ generator. The peptide component includes amino acids in dry-weight proportions of about 6.4%—about 6.5% isoleucine, about 8.6%—about 9.0% leucine, about 6.2%—about 6.8% lysine, about 5.8%—about 6.4% phenylalanine, about 3.9%—about 4.5% threonine, about 1.1%—about 1.3% tryptophan, and about 6.9%—about 7.2% valine. The food composition is characterized in that upon dilution to an isotonic solution, the peptide component is present in a concentration of about 40 g/L to about 100 g/L. The peptide component may further include about 4.5%—about 5.0% arginine, about 1.5%—about 1.7% cysteine, about 2.2% histidine, or about 4.3%—about 4.8% methionine. The peptime component may consist essentially of individual amino acids, or may include oligopeptides or polypeptides. The peptide component may include albumin or whey protein. The $CO_2$ generator may include sodium bicarbonate or an edible acid (e.g., citric acid, acetic acid, ascorbic acid, malic acid, lactic acid, tartaric acid, phosphoric acid, oxalic acid, benzoic acid, or butyric acid). The food composition may further include a sugar (e.g., glucose), a blood component (e.g., plasma, hemoglobin, gamma globulin, red blood cells, adenosine triphosphate, glucose, or cholesterol), which may be at a concentration approximately equal to a physiological level for human blood, a preservative, a stabilizer, an insect attractant, an insect repellent, a pheromone, a kairomone, an allomone, an insect phagostimulant, or a colorant. The food composition may be water-soluble, and may be dissolved in a liquid (e.g., water or blood plasma) or a gel, which may include a preservative, a stabilizer, an insect attractant, an insect repellent, a pheromone, a kairomone, an allomone, an insect phagostimulant. Protein may be present in the liquid in a concentration between about 40 g/L and 100 g/L, and the liquid may be equivalently isotonic, substantially isotonic, or isotonic.

In another aspect, a food composition includes a peptide component, sodium chloride, and a $CO_2$ generator. The peptide component includes amino acids isoleucine, leucine, lysine, phenylalanine, threonine, tryptophan, and valine in a relative proportion substantially equal to the proportions the same amino acids would have in a mixture of albumin and whey protein at a ratio between about 3:1 and about 12:1 dry weight. The food composition is characterized in that, upon mixing with water to form an isotonic solution, the resulting solution includes about 40 to about 100 grams of peptide component per ml. The peptide component may be composed principally of amino acids, or may include oligopeptides or polypeptides. The peptide component may include albumin or whey protein. The $CO_2$ generator may include sodium bicarbonate or an edible acid (e.g., citric acid, acetic acid, ascorbic acid, malic acid, lactic acid, tartaric acid, phosphoric acid, oxalic acid, benzoic acid, or butyric acid). The food composition may further include a sugar (e.g., glucose), a blood component (e.g., plasma, hemoglobin, gamma globulin, red blood cells, adenosine triphosphate, glucose, or cholesterol), which may be at a concentration approximately equal to a physiological level for human blood, a preservative, a stabilizer, an insect attractant, an insect repellent, a pheromone, a kairomone, an allomone, an insect phagostimulant, or a colorant. The food composition may be water-soluble, and may be dissolved in a liquid (e.g., water or blood plasma) or a gel, which may include a preservative, a stabilizer, an insect attractant, an insect repellent, a pheromone, a kairomone, an allomone, an insect phagostimulant. Protein may be present in the liquid in a concentration between about 40 g/L and 100 g/L, and the liquid may be equivalently isotonic, substantially isotonic, or isotonic.

In another aspect, a food composition includes a first portion including an edible acid (e.g., citric acid, acetic acid, ascorbic acid, malic acid, lactic acid, tartaric acid, phosphoric acid, oxalic acid, benzoic acid, or butyric acid), a second portion separate from the first portion containing sodium bicarbonate. At least one of the first and second portions includes a peptide component including amino acids isoleucine, leucine, lysine, phenylalanine, threonine, tryptophan, and valine, these amino acids having relative proportions substantially equal to the proportions of a mixture of albumin and whey protein at a ratio between about 3:1 and about 12:1 dry weight. The peptide component may be present in an amount sufficient that upon mixing the first portion, the second portion, and optionally water to form a mixture equivalently isotonic with blood (or substantially isotonic with blood, or isotonic with blood), the peptide component is present in a concentration of about 40-100 g/L. The food composition may further include a sugar (e.g., glucose), a blood component (e.g., plasma, hemoglobin, gamma globulin, red blood cells, adenosine triphosphate, glucose, or cholesterol), which may be at a concentration approximately equal to a physiological level for human blood, a preservative, a stabilizer, an insect attractant, an insect repellent, a pheromone, a kairomone, an allomone, an insect phagostimulant, or a colorant.

In another aspect, a method of feeding an insect includes providing a solution including a mixture of albumin and whey protein in a ratio between about 3:1 and about 12:1, respectively, sodium chloride, water, and a source of carbon dioxide, and placing the solution in a container including a barrier surface, wherein the barrier surface is configured to be penetrated by the insect to feed upon the solution. The method may further include substantially maintaining the solution at a selected temperature, or inducing convection (e.g., free or forced convection) in the solution. The method may further include exposing the solution to an insect such as a mosquito (e.g., of genus *Anopheles, Aedes,* or *Culex*). At least one of the barrier surface, the aqueous solution, and the container may include an insect attractant, an insect repellent, a pheromone, a kairomone, an allomone, or an insect phagostimulant. The source of carbon dioxide may be a chemical reaction (e.g., a reaction between sodium bicarbonate and an edible acid such as citric acid, acetic acid, ascorbic acid, malic acid, lactic acid, tartaric acid, phosphoric acid, oxalic acid, benzoic acid, or butyric acid). The solution may further include a a sugar (e.g., glucose), a blood component (e.g., plasma, hemoglobin, gamma globulin, red blood cells, adenosine triphosphate, glucose, or cholesterol), which may be at a concentration approximately equal to a physiological level for human blood, a preservative, a stabilizer, or a colorant. The concentration of protein in the solution may be from about 40 g/L to about 100 g/L. The solution may be equivalently isotonic, substantially isotonic, or isotonic.

In another aspect, a method of feeding an insect includes providing a solution including a peptide component, sodium chloride, water, and a source of carbon dioxide, and placing the solution in a container including a barrier surface, wherein the barrier surface is configured to be penetrated by the insect to feed upon the solution. The peptide component includes amino acids isoleucine, leucine, lysine, phenylalanine, threonine, tryptophan, and valine, these amino acids having relative proportions substantially equal to the proportions the same amino acids would have in a mixture of albumin and whey protein at a ratio between about 3:1 and about 12:1 dry weight. The peptide component may be composed principally of amino acids, or may include oligopeptides or polypeptides. The peptide component may include albumin or whey protein. The method may further include substantially maintaining the solution at a selected temperature, or inducing convection (e.g., free or forced convection) in the solution. The method may further include exposing the solution to an insect such as a mosquito (e.g., of genus *Anopheles*, *Aedes*, or *Culex*). At least one of the barrier surface, the aqueous solution, and the container may include an insect attractant, an insect repellent, a pheromone, a kairomone, an allomone, or an insect phagostimulant. The source of carbon dioxide may be a chemical reaction (e.g., a reaction between sodium bicarbonate and an edible acid such as citric acid, acetic acid, ascorbic acid, malic acid, lactic acid, tartaric acid, phosphoric acid, oxalic acid, benzoic acid, or butyric acid). The solution may further include a a sugar (e.g., glucose), a blood component (e.g., plasma, hemoglobin, gamma globulin, red blood cells, adenosine triphosphate, glucose, or cholesterol), which may be at a concentration approximately equal to a physiological level for human blood, a preservative, a stabilizer, or a colorant. The concentration of the peptide component in the solution may be from about 40 g/L to about 100 g/L. The solution may be equivalently isotonic, substantially isotonic, or isotonic.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

As used herein unless context dictates otherwise, the terms "feeding medium" and "food composition" include compositions suitable for feeding hemophagous insects. As used herein unless context dictates otherwise, the term "artificial diet" includes food compositions other than whole blood of a person or animal. Artificial diets may include blood components, such as but without limitation plasma, hemoglobin, or red blood cells. Food compositions, feeding media, or artificial diets may, but need not, support egg-laying in hemophagous insects.

When raising hemophagous insects (e.g., for research purposes), it may be inconvenient or expensive to provide blood meals. In some cases, insects may be kept on artificial diets which may be more readily stored and handled in a laboratory. In some cases, an artificial diet (e.g., glucose water or water-soaked raisins) has been found to be adequate for maintaining health of hemophagous insects (e.g., mosquitoes), but it has not been adequate in order to stimulate egg-laying.

While the following discussion is in the context of feeding of mosquitoes, the formulations described herein, as well as the methods of determining appropriate formulations, are expected to be applicable to other hemophagous insects as well (e.g., tsetse flies, lice, bed bugs, no-see-ums, fleas, sand flies, midges, snipe flies, horse flies, stableflies, or sheep flies).

Uchida describes a set of seven "absolutely essential" amino acids for stimulating oogenesis in *Culex pipiens pallens* mosquitoes (isoleucine, leucine, lysine, phenylalanine, threonine, tryptophan, and valine), and identifies four more that "may be essential" or "are required for a full level of initiation and promotion of egg development" (arginine, cysteine, histidine, and methionine). See, Uchida, "Balanced Amino Acid Composition Essential for Infusion-induced Egg Development in the Mosquito (*Culex pipiens pallens*)," *J. Insect Physiol.*, 39(7):615-621 (1993). See also, Uchida, et al., "Ovarian development induced in decapitated female *Culex pipiens pallens* mosquitoes by infusion of physiological quantities of 20-hydroxyecdysone together with amino acids," *J. Insect Physiol.*, 44:525-528 (1998) (stimulating (*genesis in decapitated females with a combination of 20-hydroxyecdysone hormone and a mixture of 17 amino acids). Chang, et al. found that supplementation with additional isoleucine enhanced egg production rate in *Aedes aegypti* mosquitoes fed with human red blood cells. See, Chang et al., "Amino Acid Composition of Human and Guinea Pig Blood Proteins, and Ovarian Proteins of the Yellow Fever Mosquito *Aedes aegypti*; and Their Effects on the Mosquito Egg Production," *Comp. Biochem. Physiol.*, 62A: 753-755 (1979). See also, Greenberg, "Some Nutritional Requirements of Adult Mosquitoes (*Aedes aegypti*) for Oviposition," *J. Nutr.* 43(1):27-35 (1951) (isoleucine supplementation enhanced egg-laying after blood feeding). Arsic, et al., found that albumin-containing substances would support follicular development in *Anopheles gambiae* mosquitoes, but did not support complete egg development without addition of red blood cells in this species. Griffith, et al., were able to support a population of *Culex quinquefasciatus* mosquitoes for more than fifty generations on a blood substitute artificial diet including ovalbumin, soya infant formula, globulins, and adenosine triphosphate. See, "Culturing *Culex quinquefasciatus* mosquitoes with a blood substitute diet for the females," *Med. and Vet. Entomology* 10:265-268 (1996). Each of the above-mentioned publications is incorporated by reference herein to the extent not inconsistent herewith.

A population of *Anopheles* mosquitoes may be maintained through an indefinite number of generations on our artificial feeding medium without any blood feeds. Each of the experiments described below used a combination of ovalbumin (Sigma, Grade 11, A5253, CAS 9006-59-1, containing 75%±7% protein plus carbohydrate and phosphate portions) and whey protein (SIMPLESSE™ from CP Kelco, a microparticulated whey protein concentrate containing 53% bovine whey protein plus food-grade xantham gum). In some embodiments, the dry weight ratios of albumin to whey protein may be about 1:5, about 1:4, about 1:3, about 1:2, about 1:1, about 2:1, about 3:1, about 4:1, about 5:1, about 6:1, about 7:1, about 8:1, about 9:1, about 10:1, about 11:1 or about 12:1, respectively. In addition, dry weight ratios in various ranges between any of these values is contemplated. For example, and without limitation, ratios of about 2, 25:1, about 3.25:1, about 4.25:1, about 5.5:1, about 6.5:1, about 7.5:1, about 8.5:1, about 9:5:1, about 10.5:1, and about 11.5:1. For example, and without limitation, dry weight ratios of albumin to whey protein may be about 3:1 to about 6:1, respectively; or about 3:1 to about 12:1, respectively. In addition to protein, in some embodiments a food composition may contain other macronutrients such as carbohydrates or lipids, or micronutrients such as vitamins or minerals.

Food compositions that are substantially isotonic with blood (reference osmolality of 275-300 mOsm/kg) can help avoid insect death by osmotic imbalance after feeding. Isotonicity can be achieved, for example, by either adding Ringer's salts or the formula of Griffith, et al. (cited above). As used herein, an "isotonic" solution is one having a tonicity within ±5% of the tonicity of blood (e.g., 5% less than bottom of reference range, 4% less, 3% less, 2% less, 1% less, within reference range, 1% more than top of reference range, 2% more, 3% more, 4% more, or 5% more), while a "substantially isotonic" solution is one having an tonicity within ±10% of the tonicity of blood (e.g., 10% less than bottom of reference range, 9% less, 8% less, 7% less, 6% less, 6% more than top of reference range, 7% more, 8% more, 9% more, or 10% more). An "equivalently isotonic" solution has an tonicity within ±20% of the tonicity of blood (e.g., 20% less than bottom of reference range, 19% less, 18% less, 17% less, 16% less, 15% less, 14% less, 13% less, 12% less, 11% less, 11% more than top of reference range, 12% more, 13% more, 14% more, 15% more, 16% more, 17% more, 18% more, 19% more, or 20% more).

In addition to the protein mixtures discussed above, attractants can be added to the food composition to increase mosquito feeding rates. In some embodiments, an attractant is $CO_2$. $CO_2$ can be produced within the food composition either by mixing proteins and salts with carbonated "sparkling" water, or by using a chemical $CO_2$ generator, for example, citric acid (or another acid edible by hemophagous insects, such as ascorbic acid, malic acid, lactic acid, tartaric acid, phosphoric acid, oxalic acid, benzoic acid, or butyric acid) mixed with sodium bicarbonate. Some embodiments may use other $CO_2$ generators; for example, other chemical reactions that produce $CO_2$, bubbling $CO_2$ through or blowing it onto a feeding medium, or biological $CO_2$ generators (e.g., yeast). In some embodiments, the feeding medium may be in two separate parts, which can be mixed together (e.g., at feeding time) to begin the $CO_2$-generating reaction (e.g., a reaction between an edible acid and sodium bicarbonate). In some embodiments, other attractants may be included (e.g., lactic acid, pentyl vinyl carbinol, or isolayeric acid), or other insect-behavior-modifying ingredients may be used (e.g., repellents that discourage undesired insects, pheromones, allomones, kairomones, or phagostimulants). Insect-behavior-modifying ingredients may, for example, encourage or discourage feeding of a particular species, or of insects with certain conditions (e.g., gravid females), or might encourage or discourage crop feeding or midgut engorgement.

In addition to, or instead of, attractants and other insect-behavior-modifying components, a food composition may include other active ingredients that affect mosquito metabolism or physiology. In one embodiment, a food composition may be used to control mosquito population by including a toxin, parasite, microorganism, or biocontrol agent (e.g., Ascogregarine trophozoites, *Bacillus thuringiensis* strains, *Bacillus sphaericus*, *Wolbachia*, Microsporidia such as *Nosema* sp., *Coelomomyces* sp. fungi, *Lagenidium*, *Saccharopolyspora spinosa*, *Metarrhizium anisopliae*, *Edhazardia aedes*, *Beauveria bassiana* spores, and mermithid nematodes). See, e.g., Reyes-Villanueva, et al., "Susceptibility of *Aedes aegypti* and *Aedes albopictus* larvae to *Ascogregarina culicis* and *Ascogregarina taiwanensis*" *J. Inverteb. Path.* 84:47-53 (2003); Saridaki, et al., "*Wolbachia*: more than just a bug in insects genitals," *Curr. Opinion in Microbiol.* 13:67-72 (2010); Axtell, et al., "Encapsulation of the Mosquito Fungal Pathogen *Lagendium giganteum* (Oomyetes:Lagenidiales) in Calcium Alginate," *J. Am. Mosq. Control Assoc.* 3(3):450-459 (1978); Lichtwardt, et al., "A new *Coelomomyces* pathogenic to mosquitoes in Costa Rica," *Rev. Biol. Trop.* 41(3):407-410 (1993); Schenker, et al., "The effects of *Nosema algerae* on the development of *Plasmodium yoelii nigeriensis* in *Anopheles stephensi*," *Parasitol. Res.* 78:56-59 (1992); Bukhari, et al., "Factors affecting fungus-induced larval mortality in *Anopheles gambiae* and *Anopheles stephensi*," *Malaria J.* 9(22):1-15 (2010); Perez, et al., "Spinosad, a Naturally Derived Insecticide, for Control of *Aedes aegypti* (Diptera: Culicidae): Efficacy, Persistence, and Elicited Oviposition Response," *J. Med. Entomol.* 44(4):631-638 (2007); Cetin, et al., "Evaluation of the naturally-derived insecticide spinosad against *Culex pipiens* L. (Diptera: Culicidae) larvae in septic tank water in Antalya, Turkey," *J. Vect. Ecol.* 30(1):151-154 (2005); Becnel, et al., "Influence of temperature on developmental parameters of the parasite/host system *Edhazardia aedis* (Microsporida: Amblyosporidae) and *Aedes aegypti* (Diptera: Culicidae)," *J. Invert. Pathol.* 60(3):299-303 (1992); Petersen, "Role of mermithid nematodes in biological control of mosquitoes," *Exp. Parasitol.* 33(2):239-247 (1973), each of which is incorporated by reference herein to the extent not inconsistent herewith.

In some embodiments, it may also be useful to deliver an agent to the insect. For example, for the study of malaria, *Plasmodium* parasites (e.g., *P. falciparum* gametocytes) can be added to the food composition. In some embodiments, the agent added can be a toxin, parasite, a beneficial agent, etc. In some embodiments, if toxins are added, the toxins may be sequestered (e.g., separated from the food composition or from immediate contact with the insect). In some such embodiments, these sequestered toxins may become unsequestered over a period of time, for example upon return to a breeding site, potentially killing immature insects (for example, to control a population). For example, toxins (or other agents) may include a dissolvable coating, or a cleavable blocking agent, so that they can be ingested and then excreted in a location where the coating will dissolve and release the toxin or other agent. In some embodiments, the medium may include enzymes, antibiotics, or antiseptics.

The feeding medium may also contain "inactive" ingredients that do not act directly upon the mosquito metabolism, (e.g., by providing nourishment or affecting a biological function of the mosquito). For example, the formulations described below made with SIMPLESSE™ include xantham gum. In some embodiments, this ingredient may modify the texture or rheological properties of the feeding medium. In some embodiments, other rheological agents may be added or substituted, while some embodiments may not include rheological agents. In some embodiments, the medium may include stabilizers, preservatives, colorants, pH modifiers, or other components that do not act directly upon the mosquito metabolism. In some embodiments, the medium may include blood components, such as plasma, hemoglobin, gamma globulin, red blood cells, adenosine triphosphate (ATP), glucose, or cholesterol. These ingredients may be added for their physical effects on the medium, or for their influence on insect behavior.

In some embodiments the feeding medium is a liquid having active or inactive ingredients dissolved therein. In some embodiments, one or more of the ingredients may be in suspension. In some embodiments, the feeding medium may be a gel, or may include a mixture of phases (e.g., a liquid-soaked sponge).

In some embodiments, rather than using whole albumin or whey proteins, these proteins may be fully or partially hydrolyzed. In some embodiments, peptide mixtures may further include proportions of any of the four additional amino acids that Uchida suggests "may be essential" or "are required for a full level of initiation and promotion of egg development." These proportions have been calculated using the protein sequence of albumin (see, Nisbet, et al., "The Complete Amino-Acid Sequence of Hen Ovalbumin," *Eur. J. Biochem.*, 115:335-345 (1981), which is incorporated by reference herein) and an amino acid breakdown for whey protein isolate published by Davisco Foods (see, "Whey Protein Concentrate 80%," Version 07F-0604, included herewith and incorporated by reference herein). (The amino acid breakdown of SIMPLESSE™ was not readily available, but is expected to be substantially similar to the Davisco product). Table 1 shows a breakdown by weight percent of amino acids of each of these proteins, as well as a calculated value for ratios of 4.25:1 and 8.5:1 of albumin to whey protein.

TABLE 1

|  | Albumin wt % | Whey protein wt % | 3:1 albumin: whey | 4.25:1 albumin: whey | 8:5:1 albumin: whey | 12:1 albumin: whey |
|---|---|---|---|---|---|---|
| Leucine | 8.43% | 10.8% | 9.0% | 8.9% | 8.7% | 8.6% |
| Valine | 7.29% | 5.8% | 6.9% | 7.0% | 7.1% | 7.2% |
| Isoleucine | 6.59% | 5.8% | 6.4% | 6.4% | 6.5% | 6.5% |
| Phenylalanine | 6.64% | 3.3% | 5.8% | 6.0% | 6.3% | 6.4% |
| Lysine | 5.87% | 9.6% | 6.8% | 6.6% | 6.3% | 6.2% |
| Threonine | 3.59% | 7.2% | 4.5% | 4.3% | 4.0% | 3.9% |
| Tryptophan | 1.09% | 1.8% | 1.3% | 1.2% | 1.2% | 1.1% |
| Methionine | 5.09% | 1.9% | 4.3% | 4.5% | 4.8% | 4.8% |
| Arginine | 5.25% | 2.1% | 4.5% | 4.6% | 4.9% | 5.0% |
| Histidine | 2.18% | 2.2% | 2.2% | 2.2% | 2.2% | 2.2% |
| Cysteine | 1.46% | 2.3% | 1.7% | 1.6% | 1.5% | 1.5% |
| Serine | 8.02% | 4.7% | 7.2% | 7.4% | 7.7% | 7.8% |
| Alanine | 6.26% | 4.9% | 5.9% | 6.0% | 6.1% | 6.2% |
| Glutamic acid | 9.76% | 16.7% | 11.5% | 11.1% | 10.5% | 10.3% |
| Glycine | 2.87% | 1.8% | 2.6% | 2.7% | 2.8% | 2.8% |
| Asparagine | 4.55% | unk | unk | unk | unk | unk |
| Glutamine | 4.43% | unk | unk | unk | unk | unk |
| Aspartic acid | 3.74% | 10.8% | 5.5% | 5.1% | 4.5% | 4.3% |
| Proline | 3.24% | 5.8% | 3.9% | 3.7% | 3.5% | 3.4% |
| Tyrosine | 3.64% | unk | unk | unk | unk | unk |

EXAMPLES

Each of the experiments described below used a combination of ovalbumin (Sigma, Grade 11, A5253, CAS 9006-59-1, containing 75%±7% protein plus carbohydrate and phosphate portions) and whey protein (SIMPLESSE™ from CP Kelco, a microparticulated whey protein concentrate containing 53% bovine whey protein plus food-grade xantham gum). Product information sheets for these two products ("Albumin from chicken egg white," Product Number A 5253, Sigma Aldrich Corporation, (2002); "CP Kelco Microparticulated Whey Protein Concentrate," CP Kelco (2010), available at www.cpkelco.com/products-mwpc.html) are incorporated herein by reference.

Example #1

3 grams of ovalbumin powder and 1 g of microparticulated whey protein concentrate were dissolved into 50 ml of carbonated Ringer's solution (made by dissolving 0.9 g NaCl, 0.042 g KCl, and 0.025 g $CaCl_2$ into 100 ml of carbonated $H_2O$). Carbonated $H_2O$ was unflavored TALKING RAIN™ canned soda. The resulting solution had a calculated ratio of ovalbumin to whey protein of 4.25, and a calculated protein concentration of 55.6 g/L (using the protein fractions for Sigma-Aldrich ovalbumin powder and SIMPLESSE™ microparticulated whey protein cited above). The solution was offered to 34 mosquitoes in a membrane feeder heated by water circulation, at an initial temperature of 38° C. We observed one of the mosquitoes (3%) to feed (become engorged) upon the solution, but no eggs were detected.

Example #2

Example 2 was carried out at 38° C.±0.5° C. (unless otherwise noted), using the membrane feeder described in copending and commonly owned U.S. Application No. To be Assigned (filed on even date herewith entitled INSECT FEEDER, naming E. Barçn Acar, David R. Burton, Ted B. Ellis, Emma Rae Mullen, David R. Nash, and Michael Vinton as inventors, which is incorporated by reference herein). We dissolved 3.6 g of ovalbumin' powder and 0.6 g of microparticulated whey protein concentrate into 50 ml of carbonated Ringer's solution. The resulting solution had a calculated ratio of ovalbumin to whey protein of 8.49, and a calculated protein concentration of 60.4 g/L. On two separate occasions, this diet was offered to 41 mosquitoes and to 25 mosquitoes, and 6 fed on the first occasion (15%) and 5 fed on the second occasion (20%). These mosquitoes produced eggs.

0.03 g of ATP (the amount used by Griffith, et al., cited above) were added to the above diet, and the resulting solution offered to 40 mosquitoes in a membrane feeder heated by water circulation, at an initial temperature of 38° C. Two mosquitoes (5%) were observed to feed, and no eggs were detected.

0.045 g of glucose were added to the above diet (without ATP), corresponding to a normal human blood sugar of 90 mg/dL, and the resulting solution offered to 36 mosquitoes in a membrane feeder heated by water circulation, at an initial temperature of 38° C. Three mosquitoes (8%) were observed to feed. These mosquitoes produced eggs.

Example #3

We dissolved 8 g of ovalbumin powder, 0.6 g of globulin powder, and 0.32 g of hemoglobin into 40 ml of carbonated Ringer's solution. This solution was offered to 38 mosquitoes in a membrane feeder heated by water circulation, at an initial temperature of 38° C. Three mosquitoes (8%) were observed to feed, but no eggs were detected.

Example #4

We dissolved 3 g of ovalbumin powder and 1 g of microparticulated whey protein concentrate into 50 ml of carbonated Griffith's solution (made by dissolving 0.6 g NaCl and 0.06 g of $NaHCO_3$ into 100 ml of carbonated $H_2O$). The resulting solution had a calculated ratio of ovalbumin to whey protein of 4.24, and a calculated protein concentration of 55.6 g/L. When offered to 31 mosquitoes in a membrane feeder heated by water circulation, at an initial temperature of 38° C., we observed one of the mosquitoes (3%) to feed, and this mosquito did lay eggs.

0.045 g of glucose were added to the above diet, and the resulting solution offered to 41 mosquitoes. Six mosquitoes (15%) were observed to feed. These mosquitoes produced eggs.

0.045 g of glucose and 0.01 g of powdered CENTRUM™ multivitamin were added to the above diet, and the resulting solution offered to 30 mosquitoes. Four mosquitoes (13%) were observed to feed, and these mosquitoes produced eggs. The exact amount of multivitamin that was dissolved in the solution is uncertain; vitamin particles were observed to settle at the bottom of the feeder. The addition of vitamins was observed to increase feeding rates in at least some cases, however. Suitable vitamin levels for individual vitamins can be determined by routine additional experimentation according to the techniques described herein. Liquid vitamin formulations may be used to improve solubility, although solid vitamins may also be used if adequately dissolved or suspended.

Example #5

We dissolved 3.6 g of ovalbumin powder, 0.6 g of microparticulated whey protein concentrate, and 0.045 g of glucose into 50 ml of carbonated Griffith's solution. The resulting solution had a calculated ratio of ovalbumin to whey protein of 8.49, and a calculated protein concentration of 60.4 g/L. When offered to 37 mosquitoes in a membrane feeder heated by water circulation, at an initial temperature of 38° C., we observed 8 of the mosquitoes (22%) to feed. These mosquitoes produced eggs.

Example #6

For this and Example 7, we used 1.8 g of ovalbumin powder, 0.3 g of microparticulated whey protein concentrate, 0.1 g of NaCl, 0.185 g of sodium bicarbonate ($NaHCO_3$), and 0.065 g of citric acid ($C_6H_8O_7$) dissolved in 20 ml of distilled water. The resulting solution had a calculated ratio of ovalbumin to whey protein of 8.49, and a calculated protein concentration of 75.5 g/L. The sodium bicarbonate and the citric acid react to form sodium citrate and carbon dioxide, which is evolved from the solution to serve as a mosquito attractant. On two separate occasions, this diet was offered to 29 mosquitoes and to 44 mosquitoes using the membrane feeder described in Example #2. 17 fed on the first occasion (59%) and 26 fed on the second occasion (59%). These mosquitoes produced eggs.

When 0.18 g of L-cysteine was added to the above solution (giving a calculated protein concentration of 84.5 g/L) on three occasions feeding rates were reduced: 17 of 39 mosquitoes (44%) fed the first time, 4 of 32 mosquitoes (13%) fed the second time, and 15 of 29 mosquitoes (52%) fed the third time. The first group of mosquitoes was not observed to produce eggs, but the second and third groups did.

When 0.0225 g of glucose (corresponding to a normal blood sugar of 112.5 mg/dL) were added to the above solution (without L-cysteine), feeding rates were also reduced in five repetitions: 11 of 37 mosquitoes (30%), 14 of 32 mosquitoes (44%), 10 of 28 mosquitoes (36%), 20 of 37 mosquitoes (54%), and 18 of 36 mosquitoes (50%). All groups of mosquitoes produced eggs.

When 3.02 mg of lactic acid were added to the above solution (without L-cysteine or glucose), 9 out of 20 mosquitoes (45%) were observed to feed. These mosquitoes produced eggs.

When 1 ml of deionized water in the above solution (without L-cysteine, glucose, or lactic acid) was replaced with 1 ml of acetic acid, the feeding rate dropped to 6 out of 23 mosquitoes (26%), but the mosquitoes still produced eggs. When 1 ml of isovaleric acid was substituted instead of the acetic acid, 19 of 34 mosquitoes (56%) fed on a first occasion, and 9 of 35 mosquitoes (26%) fed on a second occasion. These mosquitoes produced eggs.

Example #7

Groups of 200 mosquito pupae were randomly collected from larval trays and placed in polycarbonate and polyethylene cages, with access to water and raisins as a sugar source. Seven days later, these mosquitoes were fed a solution consisting of 1.8 g of ovalbumin powder, 0.3 g of microparticulated whey protein concentrate, 0.1 g NaCl, 0.0225 g glucose, 0.065 g citric acid, and 0.185 g sodium bicarbonate in 20 ml of deionized water. These mosquitoes laid eggs, which were hatched, and the larvae reared according to the same regimen. These mosquitoes have been bred for fifteen generations according to this protocol. Feeding rates are about 52% for each generation, and the females produced about 31.5±5.1 eggs/female over the course of the generations, with the number increasing slightly in successive generations. While these feeding and fecundity rates are lower than those for blood-fed mosquitoes (64% and 58±4.4 eggs/female in our insectary), they are still adequate to maintain a continuing mosquito population. Offspring of artificial medium-fed mosquitoes were observed to be similar to those of blood-fed mosquitoes in size, pupal weight, longevity, and sex ratio.

Various embodiments of insect feeding media and methods have been described herein. In general, features that have been described in connection with one particular embodiment may be used in other embodiments, unless context dictates otherwise. For example, the multivitamin found in Example #4 may optionally be used in any other formulation. For the sake of brevity, descriptions of such features have not been repeated, but will be understood to be included in the different aspects and embodiments described herein.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "an insect" should typically be interpreted to mean "at least one insect"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two insects," or "a plurality of insects," without other modifiers, typically means at least two insects). Furthermore, in those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Moreover, "may," "can," "optionally," and other permissive terms are used herein for describing optional features of various embodiments. These terms likewise describe selectable or configurable features generally, unless the context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A food composition, comprising:
   a protein mixture including albumin and whey protein in a ratio between about 3:1 and about 12:1 dry weight, respectively;
   sodium chloride;
   a $CO_2$ generator; and
   an insect attractant, an insect repellent, a pheromone, a kairomone, an allomone, or an insect phagostimulant.

2. The food composition of claim 1, wherein the $CO_2$ generator includes an edible acid.

3. The food composition of claim 2, wherein the edible acid is selected from the group consisting of citric acid, acetic acid, ascorbic acid, malic acid, lactic acid, tartaric acid, phosphoric acid, oxalic acid, benzoic acid, and butyric acid.

4. The food composition of claim 1, wherein the $CO_2$ generator includes sodium bicarbonate.

5. The food composition of claim 1, further comprising a sugar.

6. The food composition of claim 5, wherein the sugar is glucose.

7. The food composition of claim 1, further comprising a blood component.

8. The food composition of claim 7, wherein the blood component is selected from the group consisting of plasma, hemoglobin, gamma globulin, red blood cells, adenosine triphosphate, glucose, and cholesterol.

9. The food composition of claim 7, wherein the blood component is present at a concentration approximately equal to a normal physiological level for human blood.

10. The food composition of claim 1, further comprising a preservative.

11. The food composition of claim 1, further comprising a stabilizer.

12. The food composition of claim 1, further comprising a colorant.

13. The food composition of claim 1, wherein the food composition is water-soluble.

14. A food composition, comprising the food composition of claim 1 dissolved in a liquid.

15. The food composition of claim 14, wherein the liquid is primarily water.

16. The food composition of claim 15, wherein the liquid includes blood plasma.

17. The food composition of claim 15, wherein the liquid includes a preservative.

18. The food composition of claim 15, wherein the liquid includes a stabilizer.

19. The food composition of claim 15, wherein the liquid includes an insect attractant, an insect repellent, a pheromone, a kairomone, an allomone, or an insect phagostimulant.

20. The food composition of claim 15, wherein the liquid includes a colorant.

21. The food composition of claim 15, wherein the concentration of the protein mixture in the liquid is from about 40 g/L to about 100 g/L.

22. The food composition of claim 15, wherein the liquid is equivalently isotonic.

23. The food composition of claim 15, wherein the liquid is substantially isotonic.

24. The food composition of claim 15, wherein the liquid is isotonic.

25. A food composition, comprising the food composition of claim 1 dissolved or suspended in a gel.

* * * * *